R. M. GRUPE AND W. L. QUEST.
STEERING ATTACHMENT FOR FORDSON TRACTORS.
APPLICATION FILED DEC. 18, 1919.
1,413,726.
Patented Apr. 25, 1922.
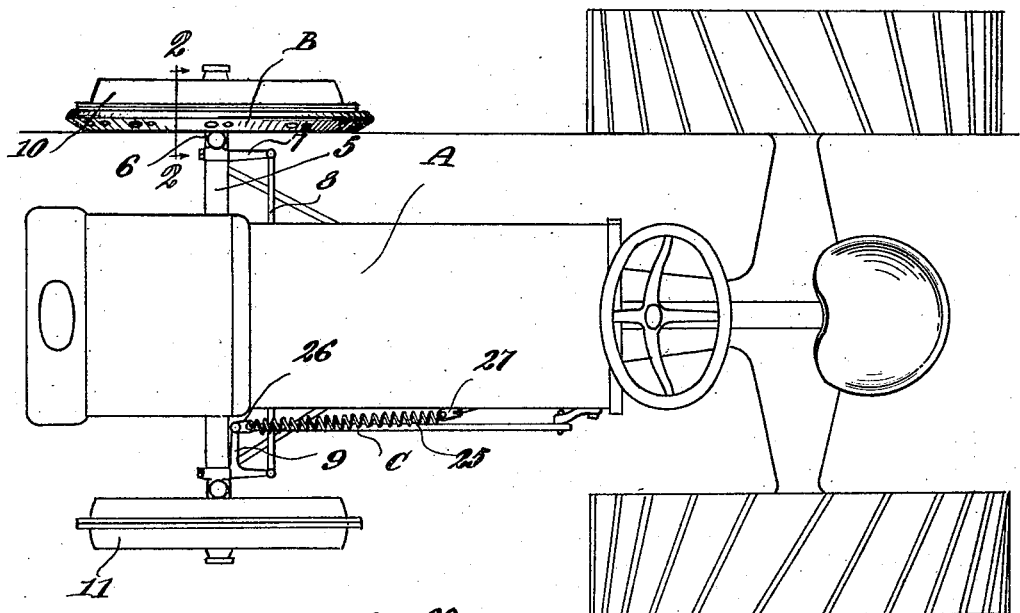
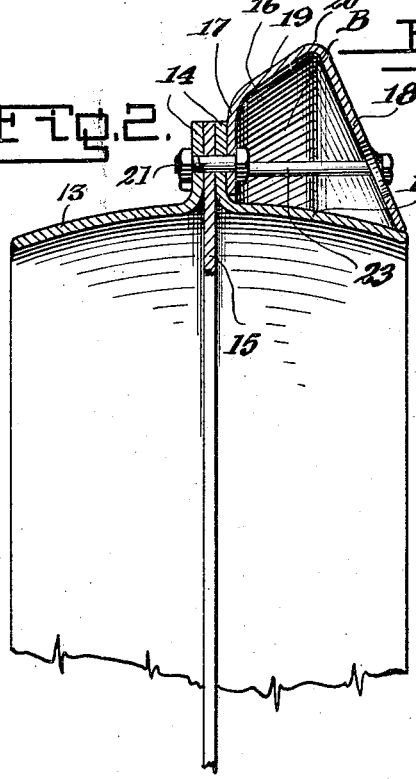
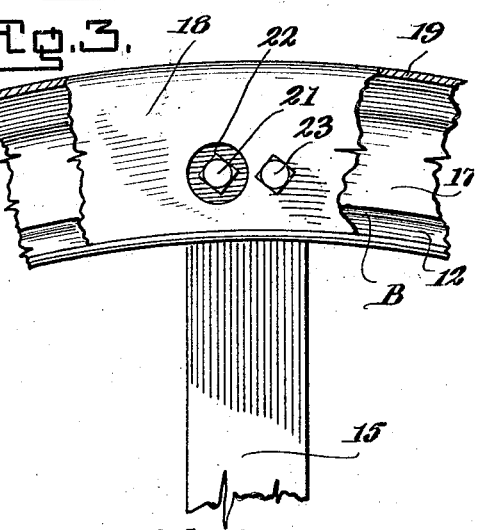
Roy M. Grupe and
William L. Quest
Inventors

UNITED STATES PATENT OFFICE.

ROY M. GRUPE AND WILLIAM L. QUEST, OF BROADVIEW, MONTANA.

STEERING ATTACHMENT FOR FORDSON TRACTORS.

1,413,726.  Specification of Letters Patent.  Patented Apr. 25, 1922.

Application filed December 18, 1919. Serial No. 345,831.

*To all whom it may concern:*

Be it known that we, ROY M. GRUPE and WILLIAM L. QUEST, citizens of the United States, residing at Broadview, in the county of Yellowstone and State of Montana, have invented certain new and useful Improvements in Steering Attachments for Fordson Tractors, of which the following is a specification.
This invention relates to tractors, and more particularly to attachments for the Fordson tractor, and the primary object of the invention is to provide an improved attachment for tractors to facilitate the steering of the tractor and keep the same in alignment with the furrows.

Another object of the invention is to provide an improved steering attachment for tractors embodying a member adapted to be secured to one of the front wheels of the tractor for engaging in the furrow, so as to keep the wheel from sliding over against the furrow and creeping out of the same.

Another object of the invention is the provision of an improved tractor attachment for one of the front steering wheels thereof embodying an annular member arranged to engage the rim of the steering wheel and having an improved means for detachably holding the attachment in place on the wheel and the parts of the wheel against displacement.

A still further object of the invention is to provide an improved means for engaging the steering rod to effect a tension on the same to keep the steering wheels from wobbling and also for keeping the wheel flush against the wall side of the furrow, thus insuring a straight furrow when plowing.
A still further object of the invention is the provision of an improved tractor attachment of the above character which is durable and efficient in use, one that is simple and easy to manufacture, and one which can be placed upon the market at a reasonable cost.

Other objects of the invention will appear in the following detailed description taken in connection with the accompanying drawings, forming a part of this specification, and in which drawings:

Figure 1 is a plan view of a tractor of the Fordson type showing the improved attachments applied thereto.

Figure 2 is a large detail diametrical section through the steering wheel of the tractor taken on the line 2—2 of Figure 1, showing the improved attachment applied thereto.

Figure 3 is a fragmentary side elevation of the steering wheel having the improved attachment applied thereto.

Referring to the drawings, in detail, wherein similar reference characters designate corresponding parts throughout the several views, the letter A indicates a tractor of the Fordson type, including the usual stationary front axle 5 carrying the stub axle 6 having the steering arms 7 connected by the connecting rod 8, and provided with the usual steering knuckle 9 to which the ordinary steering mechanism is attached. The stub shaft 6 has secured thereto in the ordinary manner the front steering wheels 10 and 11. The front steering wheel 10, which is on the right hand side or furrow side of the machine, is provided with the improved attachment B to hold the wheel in the furrow. The letter C indicates the means for exerting a tension on the steering member, so as to hold the attachment B against the wall or land side of the furrow, so as to prevent displacement thereof.

The steering wheels 10 and 11 are of the usual type and include the annular transversely curved sections 12 and 13, having the outer angular abutting flanges 14 formed on their inner ends, between which the spokes 15 are adapted to be clamped.

The improved attachment B is of annular formation, and is adapted to snugly fit on the outer section 12 of the rim and against the outwardly extending flange 14. As stated, the improved attachment B includes an annular body 16 preferably made from pressed iron or the like, and includes the vertical wall 17, which is adapted to engage against the outer surface of the angular flange 14 of the outer section 12, an outer inclined wall 18 which extends inwardly toward the longitudinal center of the wheel and a connecting inwardly inclined wall 19. As clearly shown in Figure 2 of the drawings, the outer inclined wall 18 extends a considerable distance beyond the inner vertical wall 17, and forms connection with the connecting outer wall 18 by a curved tread plate 19. The attachment B is held on the rim by bolts or suitable fastening elements 21, which are formed relatively short and are adapted to extend through registering openings formed in the vertical wall 17 of the attachment B and in the flanges 14 of the tread sections, and the spokes 15. Thus it will be seen that the bolts 21 not only form means for holding the attachment in position but also form means for holding the sections of the wheel together. The outer wall 18 is provided at parts directly in alignment with the bolts 20 with tool holes 22, for permitting the insertion of a suitable tool in the attachment to engage the heads of the bolts 21 to prevent turning thereof when the nuts are being threaded on the same. The attachment B is further held against movement by relatively long bolts 23, which extend through the aligned apertures formed in the outer wall 18, the inner vertical wall 17, the flanges 14 and the spokes 15. These bolts 23 form an additional means for holding the attachment in place, and prevent outward movement of the inclined outer wall 18 in relation to the connecting wall 19 and the vertical wall 17.

The attachment C for holding the attachment B in engagement with the land or wall side of the furrow, includes a contractile spiral spring 25 which is secured to the inner end of the steering knuckle 9 as at 26 and to the crank casing, adjacent the rear end thereof as at 27.

Thus it will be seen that a tension is exerted on the steering knuckle 9 which prevents wobbling of the wheel and effectively holds the attachment B in engagement with the land or wall side of the furrow.

While the improved steering attachment is shown attached to the Fordson tractor and has been especially designed for the said tractor, it is to be understood that the same can be effectively used on other types of tractors.

Changes in details may be made without departing from the spirit or scope of our invention; but,

We claim:

1. The combination with a steering wheel of a tractor including a pair of companion sections having arcuate bodies, outwardly extending abutting flanges and spokes extending between said flanges, and a furrow guiding attachment therefor including an annular hollow body arranged to engage the tread of one of the companion sections and its flange and bolts adapted to extend through the annular flanges and spokes to hold the sections of the wheels together and the body on the tread.

2. The combination with the steering wheel of a tractor including companion sections having arcuate bodies and right angular outwardly extending flanges, and spokes extending between said flanges, of a furrow guiding attachment therefor including an annular hollow body having a vertical wall arranged to engage the outer face of one of the flanges, and bolts arranged to extend through the vertical wall, right angular flanges and spokes as and for the purpose specified.

3. The combination with a steering wheel of a tractor including a pair of companion sections having arcuate tread portions and right angular extending flanges, and spokes positioned between said flanges, of a furrow guiding attachment therefor including an annular hollow body adapted to engage the periphery of one of the sections and including a vertical wall arranged to engage the outer surface of one of the flanges and an inclined outer wall, relatively short bolts adapted to extend through the vertical wall, the flanges and spokes, and relatively long bolts adapted to extend through the inclined wall, the vertical wall, flanges and spokes.

4. A furrow guiding attachment for tractors comprising an annular hollow body formed from a single piece of metal and including a vertical wall, an upwardly inclined intermediate section and a downwardly and outwardly inclined wall.

ROY M. GRUPE.
WILLIAM L. QUEST.